(12) United States Patent
Nakajima et al.

(10) Patent No.: US 11,247,606 B2
(45) Date of Patent: Feb. 15, 2022

(54) LIGHT EMISSION DEVICE, VEHICLE DOOR, AND NOTIFICATION METHOD

(71) Applicant: SEKISUI CHEMICAL CO., LTD., Osaka (JP)

(72) Inventors: Daisuke Nakajima, Takatsuki (JP); Yuusuke Oota, Moriyama (JP); Atsushi Nohara, Kusatsu (JP); Masashi Yanai, Okayama (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/753,031

(22) PCT Filed: Oct. 9, 2018

(86) PCT No.: PCT/JP2018/037629
§ 371 (c)(1),
(2) Date: Apr. 2, 2020

(87) PCT Pub. No.: WO2019/073986
PCT Pub. Date: Apr. 18, 2019

(65) Prior Publication Data
US 2020/0231086 A1    Jul. 23, 2020

(30) Foreign Application Priority Data
Oct. 10, 2017    (JP) .............................. JP2017-197215

(51) Int. Cl.
*B60Q 1/50*    (2006.01)
*F21V 9/32*    (2018.01)
(Continued)

(52) U.S. Cl.
CPC ................. *B60Q 1/50* (2013.01); *B60J 1/08* (2013.01); *B60Q 1/268* (2013.01); *F21V 9/32* (2018.02)

(58) Field of Classification Search
CPC ..... F21K 9/64; F21V 1/17; F21V 3/08; F21V 3/12; F21V 5/10; F21V 7/26; F21V 7/30;
(Continued)

(56) References Cited

U.S. PATENT DOCUMENTS 9,586,461 B2 *  3/2017  Okuda .............. B32B 17/10155
2014/0211498 A1 * 7/2014  Cannon .................. B60Q 3/745
                                                        362/555
(Continued)

FOREIGN PATENT DOCUMENTS

DE    20 2017 103 060    7/2017
JP    2004-256043    9/2004
(Continued)

OTHER PUBLICATIONS

International Search Report (ISR) dated Jan. 8, 2019 in International (PCT) Application No. PCT/JP2018/037629.
(Continued)

*Primary Examiner* — Joseph L Williams
*Assistant Examiner* — Jose M Diaz
(74) *Attorney, Agent, or Firm* — Wenderoth, Lind & Ponack, L.L.P.

(57) ABSTRACT

A light emission device 20 comprises a light source 21 irradiating excitation light; and a window glass 13 emitting visible light through incident radiation of the excitation light, which is attached to a car door 10, wherein the window glass 13 emits the light by irradiation with the excitation light depending on an opening/closing state of the car door 10. The present invention can provide a light emission device that enables the opening and closing of a vehicle door to be easily recognized by a person in the back, without attaching any separate part to an outer side of the vehicle door or the like.

7 Claims, 4 Drawing Sheets

(51) Int. Cl.
*B60J 1/08* (2006.01)
*B60Q 1/26* (2006.01)

(58) Field of Classification Search
CPC ..... F21V 9/30; F21V 9/32; F21V 9/38; B60Q 1/50; B60Q 1/268; B60Q 1/323; B60Q 1/2669; B60J 1/08; B60J 1/00; B60J 1/17; B32B 17/10669
See application file for complete search history.

(56) References Cited

U.S. PATENT DOCUMENTS

| | | | |
|---|---|---|---|
| 2015/0138818 A1 | 5/2015 | Salter et al. | |
| 2015/0251588 A1* | 9/2015 | Salter | H05B 47/11 362/510 |
| 2015/0253486 A1 | 9/2015 | Verger et al. | |
| 2015/0267881 A1* | 9/2015 | Salter | F21V 9/38 362/84 |
| 2015/0353003 A1 | 12/2015 | Salter et al. | |
| 2017/0293639 A1* | 10/2017 | Lee | G06F 16/5866 |
| 2017/0334342 A1 | 11/2017 | Dellock et al. | |
| 2018/0141487 A1 | 5/2018 | Osumi et al. | |
| 2018/0345631 A1 | 12/2018 | Klein et al. | |
| 2018/0370196 A1 | 12/2018 | Klein et al. | |
| 2019/0051225 A1* | 2/2019 | Sylvester | G09F 13/22 |
| 2019/0058088 A1* | 2/2019 | Jung | H01L 33/12 |

FOREIGN PATENT DOCUMENTS

| | | |
|---|---|---|
| JP | 2016-74360 | 5/2016 |
| JP | 2017-47851 | 3/2017 |
| WO | 2014/009630 | 1/2014 |
| WO | 2017/153330 | 9/2017 |

OTHER PUBLICATIONS

Extended European Search Report dated May 6, 2021, in corresponding European Patent Application No. 18866222.5.

* cited by examiner

[Fig. 1]
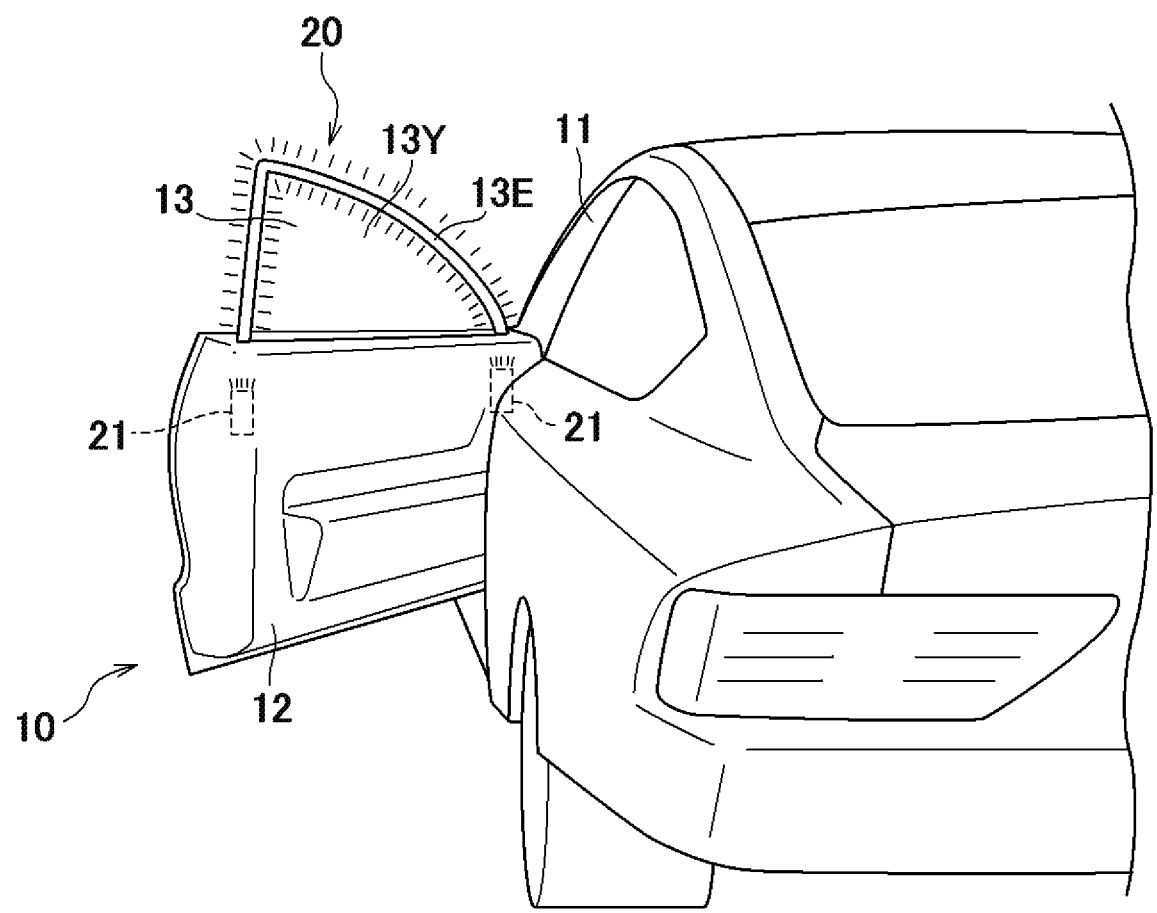

[Fig. 2]
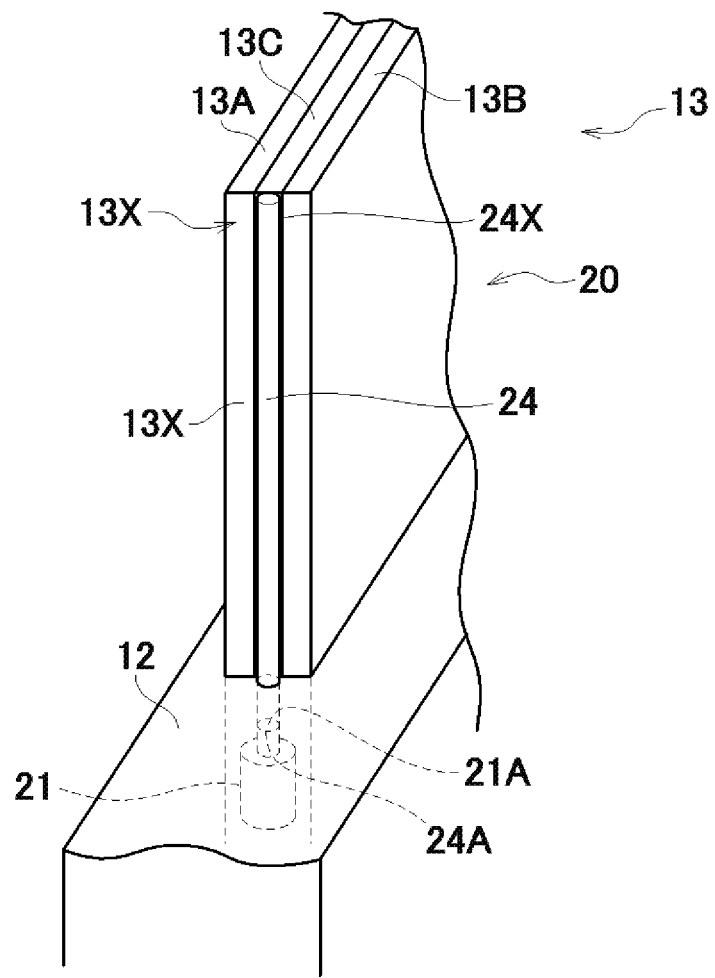

[Fig. 3]
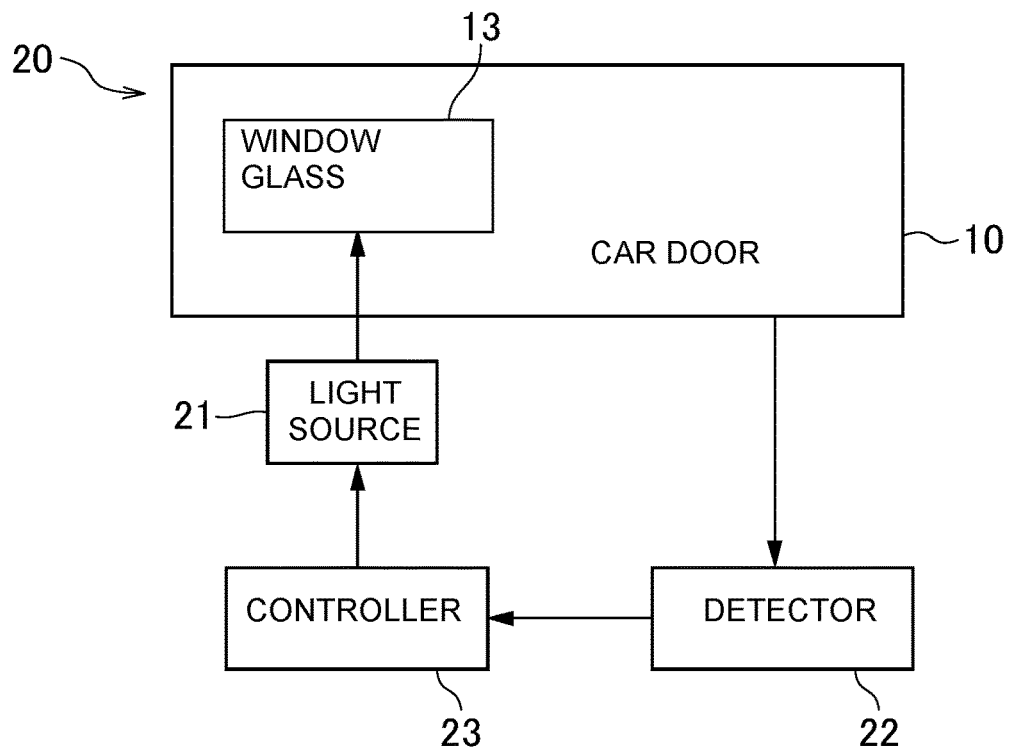
[Fig. 4]
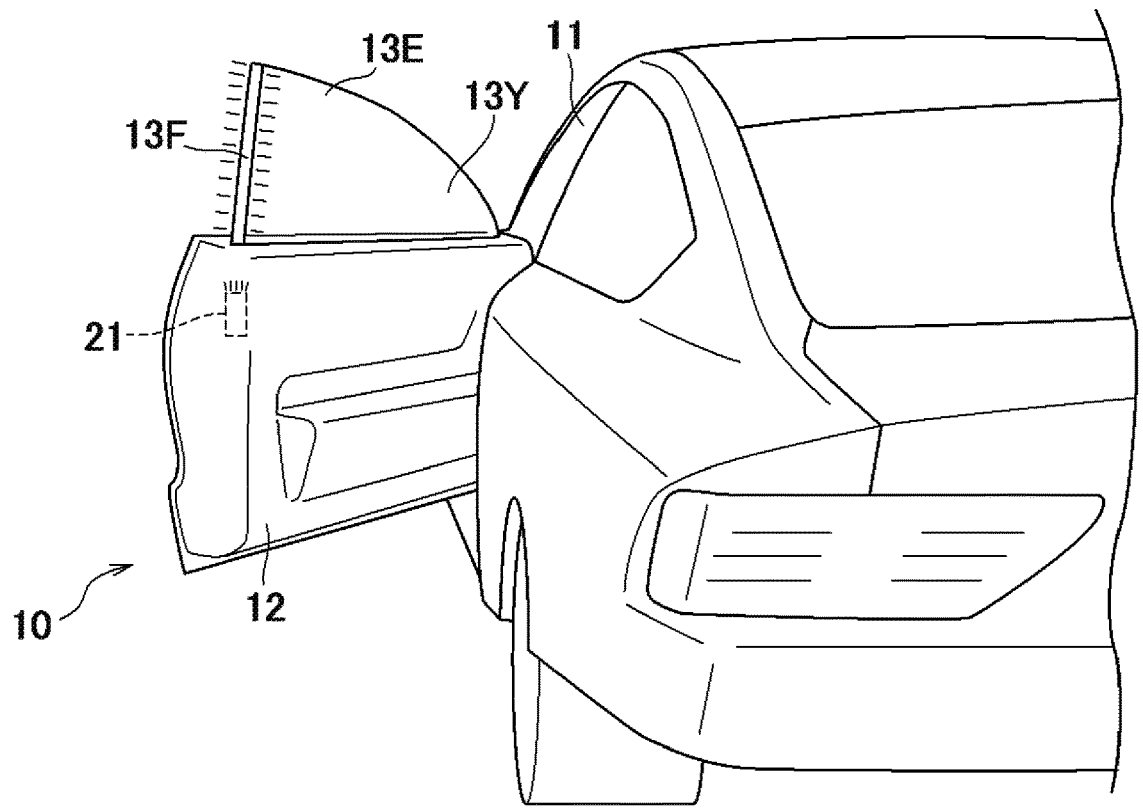

[Fig. 5]
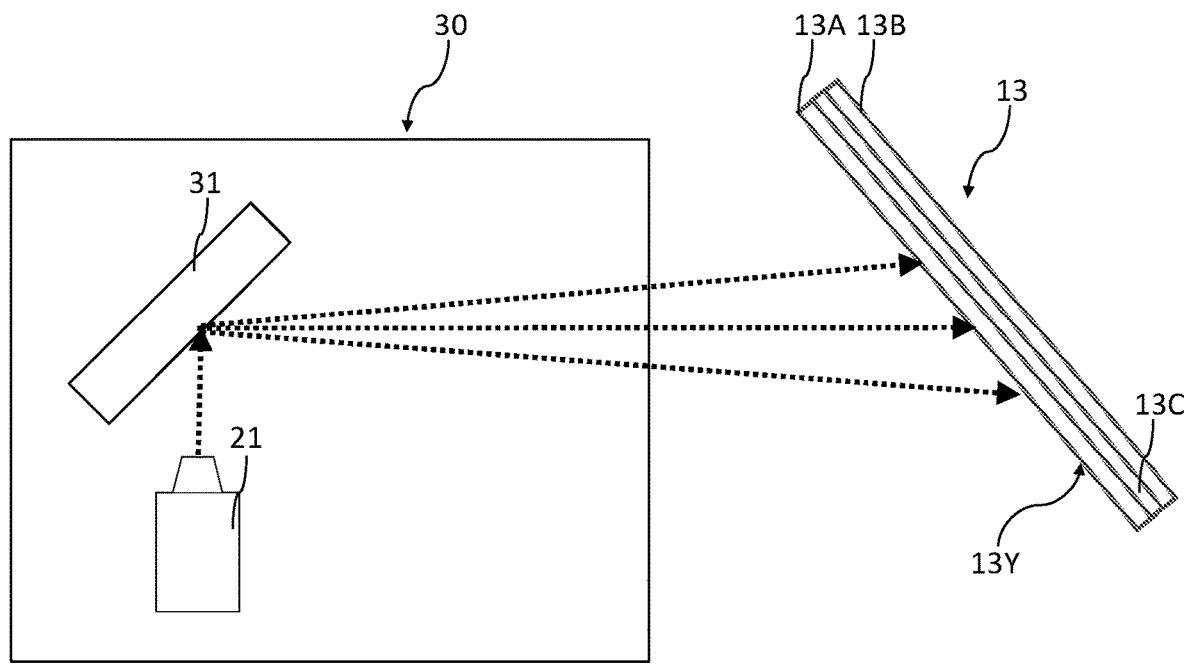

LIGHT EMISSION DEVICE, VEHICLE DOOR, AND NOTIFICATION METHOD

TECHNICAL FIELD

The present invention relates to a vehicle door, and a light emission device and a notification method, which are applied to the vehicle door.

BACKGROUND ART

Side doors of a car can be opened during a stop for getting on and off of passengers or the like, but are not generally provided with means for indicating the opening of side doors to the outside of the vehicle. Therefore, pedestrians and drivers of bicycles, motorcycles, cars, and the like in the back do not notice the opening of side doors, which may cause a contact accident. Further, some side doors are so-called sashless doors, which have no window sashes, and having no window sashes makes it further difficult for drivers or the like in the back to notice the opening of side doors.

Conventionally, it is known that a light emission device that emits light upon detecting the opening of a door is attached to an edge part of a door body, in order to provide a notification of the opening of a side door to the outside of the vehicle, for example, as shown in PTL 1 (see Patent Literature 1, for example).

CITATION LIST

Patent Literature

PTL1: JP 2004-256043 A

SUMMARY OF INVENTION

Technical Problem

However, the light emission device disclosed in PTL 1 is attached to the outside of the door as a separate part and is not practical. Further, since it is attached to the outside of the door body, it is difficult to recognize the emission from the back side when the door is opened, and it is impossible to sufficiently notify, of the opening of the side door, drivers, pedestrians, and the like in the back.

The present invention has been devised in view of the circumstances described above, and an object thereof is to provide a light emission device, a vehicle door, and a notification method which enable a person in the back to easily recognize the opening and closing of a vehicle door without attaching a separate part to the outside of the vehicle door or the like.

Solution to Problem

As a result of diligent studies, the inventors have found that the aforementioned problems can be solved by making a window glass of a vehicle door capable of emitting visible light through incident radiation of excitation light, and allowing the window glass to emit light by irradiation with the excitation light depending on an opening/closing state of the vehicle door, thereby accomplishing the present invention below. That is, the present invention provides [1] to [11] below.

[1] A light emission device comprising: a light source irradiating excitation light; and a window glass emitting visible light through incident radiation of the excitation light and being attached to a vehicle door, wherein the window glass emits light by irradiation with the excitation light depending on an opening/closing state of the vehicle door.

[2] The light emission device according to [1], wherein the window glass comprises a transparent plate.

[3] The light emission device according to [2], wherein
the window glass has a multilayer structure comprising a laminate of at least one transparent plate and a resin film, and
the resin film comprises a resin and a fluorescent material capable of emitting visible light through incident radiation of excitation light.

[4] The light emission device according to any one of [1] to [3] above, wherein the excitation light enters from the outer peripheral surface side of the window glass.

[5] The light emission device according to any one of [1] to [4] above, wherein the window glass emits light by irradiation with the excitation light when the vehicle door is opened.

[6] A vehicle door comprising the light emission device according to any one of [1] to [5] above.

[7] A notification method for notifying a person outside a vehicle that a vehicle door is present, comprising: using a light source irradiating excitation light, and a window glass emitting visible light through incident radiation of the excitation light and attached to a vehicle door to allow the window glass to emit light by irradiation with the excitation light depending on an opening/closing state of the vehicle door.

[8] The notification method according to [7] above, wherein the window glass comprises a transparent plate.

[9] The notification method according to [7] or [8], wherein the window glass has a multilayer structure comprising a laminate of at least one transparent plate and a resin film, and the resin film comprises a resin and a fluorescent material capable of emitting visible light through incident radiation of the excitation light.

[10] The notification method according to any one of [7] to [9] above, wherein the excitation light enters from the outer peripheral surface side of the window glass.

[11] The notification method according to any one of [7] to [10] above, wherein the window glass is capable of emitting light by irradiation with the excitation light when the vehicle door is opened.

Advantageous Effects of Invention

The present invention can provide a light emission device, a vehicle door, and a notification method which enable a person in the back to easily recognize the opening and closing of the vehicle door without attaching a separate part to an outer side of the car door.

BRIEF DESCRIPTION OF DRAWINGS

FIG. 1 is a schematic view showing a vehicle door according to the first embodiment of the present invention.

FIG. 2 is a schematic perspective view showing a part of a light emission device according to the first embodiment of the present invention.

FIG. 3 is a block diagram showing the light emission device according to the first embodiment of the present invention.

FIG. 4 is a schematic view showing a modification of the vehicle door according to the first embodiment of the present invention.

FIG. 5 is a schematic diagram showing the overview of a light emission device according to the second embodiment of the present invention.

DESCRIPTION OF EMBODIMENTS

The embodiments of a vehicle door, a light emission device, and a notification method using the light emission device of the present invention will be illustrated below by referring to the drawings.

FIG. 1 shows a vehicle door according to the first embodiment of the present invention. As shown in FIG. 1, in the first embodiment, the vehicle door is a car door 10. The car door 10 includes a door body 12 attached to a car body 11 via a hinge or the like, and a window glass 13 attached to an upper part of the door body 12. The car door 10 illustrated in FIG. 1 is a side door configured to open or close an opening provided in a side part of the car body 11. As shown in FIG. 1, the car door 10 has no window sash along the outer periphery of the window glass 13, which is so-called sashless door, but a car door having a window sash also may be used. As will be described later, the window glass 13 contains a fluorescent material and is capable of emitting visible light through incident radiation of excitation light, for example.

The car further comprises a light source 21 capable of irradiating excitation light, and the window glass 13 and the light source 21 constitute a light emission device 20. In this embodiment, the light source 21 is attached to the car door 10. Thus, the car door 10 includes the light emission device 20. As the light source 21, a laser light source, an LED light source, a xenon lamp, or the like is used. The excitation light irradiated from the light sources 21 is incident on the window glass 13, and thereby, visible light is emitted from the window glass 13. In this embodiment, the excitation light emitted from the light sources 21 is incident on the window glass 13 through the light guide 24 (see FIG. 2), as described later.

The maximum emission wavelength of the light irradiated from the light sources 21 is not particularly limited, but is specifically preferably 420 nm or less, more preferably 410 nm or less, further preferably 408 nm or less. Further, it is preferably 300 nm or more, more preferably 350 nm or more, further preferably 380 nm or more. By adjusting the maximum emission wavelength of the light irradiated from the light sources 21 to such a lower limit or more and such an upper limit or less, the window glass 13 can emit visible light more efficiently by the excitation light irradiated from the light sources 21.

In the window glass 13, the portion that emits visible light by irradiation with the excitation light may be the entire surface of the window glass or a part thereof. In the case when a part of the window glass 13 emits, an outer peripheral end part 13E of the window glass 13 emits light in this embodiment, as shown in FIG. 1.

Here, the outer peripheral end part 13E is preferably a region with a length of 30% or less of the dimension of the glass from the edge of the window glass 13. Further, the aforementioned length is more preferably 15% or less. Further, the aforementioned length is preferably 1% or more, more preferably 3% or more. The edges mean the outermost portions of the exposed portion of the glass surface inside the car, with the car door 10 opened and the window glass 13 fully closed. Further, the dimension of the glass refers to an average of the maximum length in the horizontal direction and the maximum length in the vertical direction in an exposed portion of the glass surface inside the car, with the car door 10 opened and the window glass 13 fully closed.

Further, the portion of the window glass 13 that emits light means a portion with a luminance of the window glass 13 of 100 cd/m$^2$ or more, as measured at a distance of 35 cm from the light emitting surface using a color and luminance meter ("CS-150" manufactured by KONICA MINOLTA, INC). Accordingly, a site that slightly emits light by irradiation with excitation light is not regarded as a light emitting portion in this description.

FIG. 2 is a view for illustrating the light emission device according to this embodiment further in detail.

The light emission device 20 according to this embodiment further has a light guide 24, and the light guide 24 is disposed so as to extend along an outer peripheral surface 13X of the window glass 13. The excitation light irradiated from the light source 21 is incident thereon from the outer peripheral surface 13X side of the window glass 13 via the light guide 24. An end part 24A of the light guide 24 is disposed, for example, inside the door body 12. An output end 21A of the light source 21 is opposed to the end part 24A of the light guide 24, so that the excitation light from the light source 21 is incident on the end part 24A.

The light guide 24 needs only to be able to radiate the excitation light, which has been incident on the end part 24A, from a side surface 24X of the light guide 24. Specifically, side emission type optical fibers may be used. Examples of the side emission type optical fibers include optical fibers having core and clad in which light scatterers or the like are dispersed. Since, in the side surface 24X of the light guide 24, the portion thereof that is not opposed to the window glass 13 is not required to radiate the excitation light, a film that absorbs or reflects excitation light may be formed thereon. Specifically, a film containing an ultraviolet absorber or the like may be formed thereon.

Light irradiated radiated from a side surface 24X of the light guide 24 enters the window glass 13 from the outer peripheral surface 13X side of the window glass 13. The excitation light that has entered the window glass 13 is wavelength-converted by a fluorescent material contained in the window glass 13 and is radiated as visible light from the window glass 13.

For example, the light guide 24 is composed of a single fiber, and is provided along the entire periphery of the outer peripheral surface 13X of the outer peripheral end part 13E excluding the lower end side, and both end parts 24A of the light guide 24 are disposed inside the door body 12. As shown in FIGS. 1 and 2, the excitation light may enter both end parts 24A of the light guide 24 respectively from two light sources 21 provided inside the door body 12.

However, the number of light guides 24 is not limited, and two guides may be disposed along the outer peripheral surface 13X at different positions from each other in the peripheral direction of the window glass 13, for example. In such a case, the excitation light may enter the light guides from each of the light sources 21, 21, respectively. Further, three or more light guides may be provided.

Here, the excitation light enters from the outer peripheral surface 13X side of the window glass 13, so that it penetrates into the window glass 13 with the amount of light being attenuated. Accordingly, the amount of light of the visible light emitted from the window glass 13 is relatively high in the vicinity of the outer peripheral surface 13X (that is, the outer peripheral end part 13E of the window glass 13), and the amount of the light decreases toward the inside of the window glass, so that the light emission from the window glass 13 has a gradation and light emission having high design quality can be realized.

Further, as shown in FIG. 1, the light emission from the window glass 13 is adjusted so that only the outer peripheral end part 13E of the window glass 13 can emit light, by appropriately setting the amount of light from the light source or the like. Further, the entire window glass 13 can emit light by setting the amount of light large. Moreover, the emission area of the window glass 13 can be configured to be adjustable by providing an adjustment switch or the like in the car.

As shown in FIG. 2, the window glass 13 is, for example, a laminated glass including two sheets of transparent plates 13A and 13B, and an interlayer 13C disposed therebetween, with the transparent plates 13A and 13B bonded by the interlayer 13C. In the window glass 13, the interlayer 13C may be composed of a resin film (light emitting layer) containing a fluorescent material, or may include two or more resin films at least one of which is a resin film (light emitting layer) containing a fluorescent material. However, the window glass 13 is not limited to such a configuration, and may have any configuration as long as at least one layer is a light emitting layer that emits light, as will be described in detail below.

The light guide 24 may be configured so that the side surface 24X is opposed to or in contact with the light emitting layer of the window glass 13 (in FIG. 2, the interlayer 13C), for enhancing the incidence efficiency of excitation light on the window glass 13. Further, when the interlayer 13C provided between the two sheets of the transparent plates 13A and 13B has a resin film composed of a light emitting layer, the light guide 24 may be disposed between the two sheets of transparent plates 13A and 13B on the outer peripheral surface 13X or in the vicinity of the outer peripheral surface 13X. In such a case, the light guide 24 may be disposed, for example, so as to be embedded in the interlayer 13C.

In this embodiment, whether or not the window glass 13 emits light is determined depending on the opening/closing state of the car door 10. Specifically, when the car door 10 is opened, excitation light is emitted from the light source 21, and the excitation light is incident on the window glass 13, thereby allowing the window glass 13 to emit light. When the window glass 13 emits light, notification of the presence of the car door 10 is provided to the outside of the car, so that pedestrians or other drivers are notified that the car door 10 is opened.

The emission operation of the window glass 13 and a notification method using the window glass will be described below in detail by referring to FIG. 3.

FIG. 3 is a block diagram showing the control operation of the light emission device 20. The light emission device 20 further includes a detector 22 configured to detect the opening/closing state of the car door 10, and a controller 23 configured to control the entire light emission device 20. The detector 22 detects the opening and closing of the car door 10, and known means may be used therefor, such as a door courtesy switch and a position sensor that detects the door position. The controller 23 controls the light source 21 depending on an opening/closing state of the door detected by the detector 22. The controller 23 is generally composed of a CPU provided in the car body 11 and the like, but is not specifically limited.

In this embodiment, whether or not the car door 10 is opened may be determined based on the detection results by the detector 22. Specifically, in the case when a door courtesy switch or the like is used as the detector 22, whether or not the car door 10 is opened is determined based on whether or not the car door 10 is fixed to the car body by a catch lock or the like. Further, in the case when a position sensor or the like is used, for example, the car door 10 may be determined to be opened when the car door 10 is opened by a predetermined amount or more.

When the detector 22 determines that the car door 10 is opened, the controller 23 turns on the light source 21 to allow the light source 21 to irradiate excitation light, thereby allowing the window glass 13 to emit light. As the window glass 13 emits light, notification of the opening of the car door 10 is provided to the outside of the car.

In this embodiment, when a car door is opened, people outside the car, particularly, for example drivers or pedestrians in the back are notified that the car door 10 is open by the window glass emitting light, as described above. Accordingly, contact accidents due to the car door 10 being opened can be prevented. Further, since the emission can be caused by excitation light being incident on the window glass, notification of the opening of the side door can be provided without attaching a separate part to the outside of the side door.

Further, in the case where the window glass 13 is of sashless type, as shown in FIG. 1, the emission of the window glass 13 can be visually recognized from the outside of the vehicle easily without being blocked by a window sash. Accordingly, even in the case of a sashless door, in which the presence of the car door has been conventionally difficult to visually recognize from the outside of the car, notification of the presence of the window glass 13 can be easily provided to the outside of the car.

In the first embodiment described above, the light guide 24 is provided along the entire part of the outer peripheral end part 13E excluding the lower end, but is not necessarily provided along the entire part. However, as shown in FIG. 4, the light guide 24 is preferably provided at least along the outer peripheral surface 13X of a rear end part 13F, so that at least the end part (rear end part) 13F on the rear side of the outer peripheral end part 13E can emit light. Notification of the presence of the car door 10 to the back side of the car is facilitated by the rear end part 13F emitting light when the car door is opened. Particularly in the case of being a sashless door, notification of the presence of the car door is further facilitated.

However, in the case where the window glass 13 partially emits light, any part of the window glass may emit light, without limitation to the outer peripheral end part 13E.

Further, the light guide 24 is used in the first embodiment above, but the excitation light from the light source 21 may be directly incident on the outer peripheral surface 13X side of the window glass 13, without using the light guide 24. In such a case, a plurality of small light sources 21 such as LED chips, for example, may be attached to the outer peripheral surface 13X of the window glass 13. Further, as described above, in the case where the window glass 13 includes the two sheets of the transparent plates 13A and 13B and the interlayer 13C, and the interlayer 13C has a resin film that serves as a light emitting layer, the plurality of light sources 21 such as LED chips may be disposed on the outer peripheral surface 13X or in the vicinity of the outer peripheral surface 13X between the transparent plates 13A and 13B. In such a case, the light source 21 such as LED chips may be, for example, attached to the transparent plates, or may be embedded in the interlayer 13C (particularly, the resin film that serves as a light emitting layer).

In such a case, the optical axis of the light source 21 is typically parallel to the plane direction of the window glass 13, but may be appropriately inclined to the plane direction. The inclination of the optical axis makes the excitation light from the light source 21 difficult to penetrate the inside, thereby facilitating only emission of the outer peripheral end part 13E alone.

Next, the second embodiment will be described by referring to FIG. 5. In the first embodiment described above, such a mode has been shown in which the window glass 13 emits light through incident radiation of the excitation light from the outer peripheral surface 13X side; however, in this embodiment, the window glass 13 emits light by the excitation light that is incident from the surface 13Y on the car interior side of the window glass 13. The difference of the second embodiment from the aforementioned first embodiment will be described below.

In this embodiment, a light source unit 30 including a MEMS (Micro Electro Mechanical Systems) mirror 31, in addition to the light source 21 from which the excitation light is irradiated, is used. The light source unit 30 is located at any positon without specific limitation, as long as it is located at a position where the window glass 13 can be irradiated with the excitation light inside a car. For example, in the case where the window glass 13 is a side glass, as described above, it may be provided on the inner surface of the door body 12 of the car door 10.

The MEMS mirror 31 is, for example, swingable about two axes and irradiates the window glass 13 with the light from the light source 21 with scanning. In such a case, the window glass 13 is irradiated with the excitation light from the light source 21 as scanning light via the MEMS mirror 31 the drive of which is controlled. In this embodiment, a desired part of the window glass 13 can emit light by controlling the drive of the MEMS mirror 31. Accordingly, only a part of the window glass 13 such as the outer peripheral end parts 13E and 13F can emit light, as described above, and the entire surface also can emit light.

Further, since a light source unit using a MEMS mirror is generally small, use of the MEMS mirror enables window glass to emit light almost without narrowing the indoor space inside of the car.

Any light source unit other than the light source unit having the MEMS mirror 31 may be used as the light source unit in this embodiment, as long as it can irradiate the surface 13Y on the car interior side of the window glass with the excitation light. Examples of such a light source unit may include a light source unit that emits scanning light other than the light source unit having the MEMS mirror 31. Since such a light source unit that emits scanning light is generally small, the light source unit enables the window glass to emit light for display without occupying a large space inside the car, like the light source unit having the MEMS mirror.

Further, the light source unit may be a light source unit capable of irradiating the window glass with the excitation light as beam light. The beam light irradiates all portions of the window glass that emit light at the same timing, and no scanning shift or the like occurs as in the case of using scanning light.

Examples of the light source unit other than the light source unit having the MEMS mirror include those utilizing the DMD (Digital Micromirror Device) method using DLP (Digital Light Processing), LCOS (Liquid crystal on silicon), or the like.

Further, the side door to which the vehicle door of the present invention is applied is not limited to a door that is opened and closed by swing-action on a hinge, and may be a slide door that is opened and closed by sliding in a side part of the car body. Even in the case of a slide door, occurrence of accidents can be prevented by notifying people outside the vehicle that the door is opened for getting off of a passenger, using emission of the window glass.

Further, the side door to which the light emission device of the present invention is applied may be any one of a front side door and a rear side door. Further, there is no limitation to a side door, and the light emission device of the present invention can be applied also to other car doors, for example, a back door.

Further, the case where the vehicle door of the present invention is used for a car has been described above, but the vehicle to which the vehicle door of the present invention is applied is not limited to cars, and may be another vehicle. Examples of the other vehicle include railway vehicles such as electric trains, steam-locomotive pulled trains, and trains, forklifts, heavy machineries for civil engineering such as excavators, carts, and amusement park vehicles, but there is no limitation to these.

Further, a mode in which the window glass emits light when the car door is opened is described in the aforementioned description, but the window glass may emit light when the car door is closed. By using such a mode, people outside the vehicle can also be notified of the opening/closing state of the car door, and thus transportation accidents can be reduced.

[Window Glass]

Next, the window glass used in the present invention will be described in detail. The window glass used in the present invention may be composed of a single layer or may have a multilayer structure having two or more layers. Further, in the window glass, it is preferable that at least one layer is a transparent plate. The transparent plate may be composed of any one of inorganic glass and organic glass. The organic glass is so-called resin glass. The window glass having a multilayer structure may include one transparent plate or may include two or more transparent plates. Further, in the window glass, such a transparent plate may contain a fluorescent material and serve as a light emitting layer that emits light through incident radiation of excitation light, or a layer other than the transparent plate may contain a fluorescent material and serve as a light emitting layer.

Further, the window glass preferably has a multilayer structure comprising a laminate of at least one transparent plate and a resin film, and it is more preferable that the resin film contains a resin and a fluorescent material to serve as a light emitting layer in the multilayer structure. Thereby, not only the end part of the window glass but also a wider region thereof can emit light with a high intensity.

Further, the light emitting layer is not limited to the resin film and the transparent plate mentioned above and may be a fluorescent material coating formed by vacuum vapor deposition, sputtering, or the like of a fluorescent material. The fluorescent material coating may be formed, for example, on at least one surface of the transparent plate.

(Fluorescent Material)

The fluorescent material emits visible light through incident radiation of excitation light, more specifically, absorbs the excitation light irradiated from the aforementioned light source to emit visible light having a wavelength longer than that of the excitation light. Further, the fluorescent material may be a material that emits so-called phosphorescence by irradiation with the excitation light.

Specifically, examples of the aforementioned fluorescent material include a lanthanoid complex having a ligand containing a halogen atom since it can exert high luminescence. Among lanthanoid complexes, the lanthanoid complex having a ligand containing a halogen atom emits light with high emission intensity by irradiation with light rays. Examples of the lanthanoid complex having a ligand containing a halogen atom include a lanthanoid complex having a monodentate ligand containing a halogen atom and a lanthanoid complex having a multidentate ligand containing a halogen atom such as a lanthanoid complex having a bidentate ligand containing a halogen atom, a lanthanoid complex having a tridentate ligand containing a halogen atom, a lanthanoid complex having a tetradentate ligand containing a halogen atom, a lanthanoid complex having a pentadentate ligand containing a halogen atom, and a lanthanoid complex having a hexadentate ligand containing a halogen atom.

Among these, the lanthanoid complex having a bidentate ligand containing a halogen atom or the lanthanoid complex having a tridentate ligand containing a halogen atom can emit visible light with high emission intensity by irradiation with light at a wavelength of 300 to 410 nm.

Further, the lanthanoid complex having a bidentate ligand containing a halogen atom or the lanthanoid complex having a tridentate ligand containing a halogen atom also has excellent heat resistance. Since window glass is often used under high-temperature condition due to irradiation with infrared rays of sunlight, use of the lanthanoid complex having a bidentate ligand containing a halogen atom or the lanthanoid complex having a tridentate ligand containing a halogen atom can prevent deterioration of the fluorescent material.

In this description, the lanthanoid includes lanthanum, cerium, praseodymium, neodymium, promethium, samarium, europium, gadolinium, terbium, dysprosium, holmium, erbium, thulium, ytterbium, or lutetium. For obtaining still higher emission intensity, the lanthanoid is preferably neodymium, europium, or terbium, more preferably europium or terbium, further preferably europium.

Examples of the bidentate ligand containing a halogen atom include a ligand having a structure represented by formula (1) below and a ligand having a structure represented by formula (2) below.

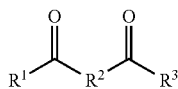

(1)

In formula (1) above, $R^1$ and $R^3$ each represent an organic group, at least one of $R^1$ and $R^3$ is an organic group containing a halogen atom, and $R^2$ represents a linear organic group having one or more carbon atoms. $R^1$ and $R^3$ above are each preferably a hydrocarbon group, more preferably a hydrocarbon group having 1 to 10 carbon atoms, further preferably a hydrocarbon group having 1 to 5 carbon atoms, particularly preferably a hydrocarbon group having 1 to 3 carbon atoms. The hydrogen atoms in the aforementioned hydrocarbon group may be partially replaced by atoms other than hydrogen atoms and functional groups. Examples of the hydrocarbon group having 1 to 3 carbon atoms include a methyl group, an ethyl group, and a propyl group, with no hydrogen atoms replaced, and a methyl group, an ethyl group, and a propyl group, with the hydrogen atoms partially replaced by halogen atoms. Fluorine atoms, chlorine atoms, bromine atoms, and iodine atoms can be used as the halogen atoms that partially replace the hydrogen atoms of the methyl group, the ethyl group, and the propyl group. As the hydrocarbon group having 1 to 3 carbon atoms, a methyl group, an ethyl group, and a propyl group, with the hydrogen atoms partially replaced by halogen atoms are preferable, and trifluoromethyl groups are more preferable, since they emit light with high emission intensity.

$R^2$ above is preferably an alkylene group having one or more carbon atoms, more preferably an alkylene group having 1 to 5 carbon atoms, most preferably a methylene group having one carbon atom. The alkylene group having one or more carbon atoms may have hydrogen atoms partially replaced by atoms other than the hydrogen atoms and functional groups.

The lanthanoid complex having a ligand containing a halogen atom may have at least one ligand containing a halogen atom and may have a ligand containing no halogen atoms. Examples of the ligand containing no halogen atoms include a ligand that is the same as the ligand of formula (1) above except for containing no halogen atoms, and a ligand having a structure represented by formula (2) to (8) below. The ligand having a structure represented by formula (2) to (8) below may have hydrogen atoms partially or entirely replaced by —COOR, —SO$_3$, —NO$_2$, —OH, an alkyl group, —NH$_2$, and the like.

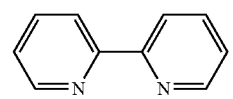

(2)

In formula (2) above, two Ns may be located at any positions in the bipyridine skeleton. For example, the two Ns are located at the 2- and 2'-positions, the 3- and 3'-positions, the 4- and 4'-positions, the 2- and 3'-positions, the 2- and 4'-positions, or the 3- and 4'-positions in the bipyrdine skeleton. Among these, the two Ns are preferably located at the 2- and 2'-positions.

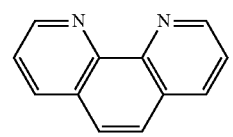

(3)

In formula (3) above, the two Ns may be located at any positions in the bipyridine skeleton. Among these, the two Ns are preferably located at the 1- and 10-positions.

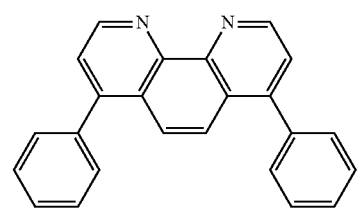

(4)

In formula (4) above, the two Ns may be located at any positions in the bipyridine skeleton. Among these, the two Ns are preferably located at the 1- and 10-positions.

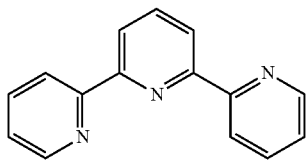
(5)

In formula (5) above, the three Ns may be located at any positions in the terpyridine skeleton.

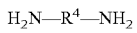
(6)

In formula (6) above, $R^4$ positioned at the center represents a linear organic group having one or more carbon atoms.

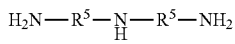
(7)

In formula (7) above, two $R^5$s each represent a linear organic group having one or more carbon atoms.

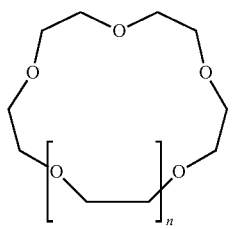
(8)

In formula (8) above, n represents an integer of 1 or 2.

Examples of the lanthanoid complex having a bidentate ligand containing a halogen atom include tris(trifluoroacetylacetone)phenanthroline europium (Eu(TFA)$_3$phen), tris(trifluoroacetylacetone)diphenylphenanthroline europium (Eu(TFA)$_3$dpphen), tris(hexafluoroacetylacetone)diphenylphenanthroline europium, tris(hexafluoroacetylacetone) bis(triphenylphosphine) europium, tris(trifluoroacetylacetone)2,2'-bipyridine europium, tris(hexafluoroacetylacetone)2,2'-bipyridine europium, tris(5,5,6,6,7,7,7-heptafluoro-2,4-pentanedionate)2,2'-bipyridine europium ([Eu(FPD)$_3$]bpy), tris(trifluoroacetylacetone)3,4,7,8-tetramethyl-1,10-phenanthroline europium ([Eu(TFA)$_3$]tmphen), tris(5,5,6,6,7,7,7-heptafluoro-2,4-pentanedionate)phenanthroline europium ([Eu(FPD)$_3$]phen), terpyridine trifluoroacetylacetone europium, and terpyridine hexafluoroacetylacetone europium.

Examples of the lanthanoid complex having a bidentate ligand containing a halogen atom additionally include tris(trifluoroacetylacetone)phenanthroline terbium (Tb(TFA)$_3$phen), tris(trifluoroacetylacetone)diphenylphenanthroline terbium (Tb(TFA)$_3$dpphen), tris(hexafluoroacetylacetone)diphenylphenanthroline terbium, tris(hexafluoroacetylacetone)bis(triphenylphosphine) terbium, tris(trifluoroacetylacetone)2,2'-bipyridine terbium, tris(hexafluoroacetylacetone)2,2'-bipyridine terbium, tris(5,5,6,6,7,7,7-heptafluoro-2,4-pentanedionate)2,2'-bipyridine terbium ([Tb(FPD)$_3$]bpy), tris(trifluoroacetylacetone)3,4,7,8-tetramethyl-1,10-phenanthroline terbium ([Tb(TFA)$_3$]tmphen), tris(5,5,6,6,7,7,7-heptafluoro-2,4-pentanedionate)phenanthroline terbium ([Tb(FPD)$_3$]phen), terpyridine trifluoroacetylacetone terbium, and terpyridine hexafluoroacetylacetone terbium.

As the halogen atom contained in the ligand of the lanthanoid complex, a fluorine atom, a chlorine atom, a bromine atom, or an iodine atom can be used. Among these, a fluorine atom is suitable for stabilizing the structure of the ligand.

Among the lanthanoid complex having a bidentate ligand containing a halogen atom or the lanthanoid complex having a tridentate ligand containing a halogen atom, a lanthanoid complex having a bidentate ligand containing a halogen atom and having an acetylacetone skeleton is particularly suitable due to its excellent initial luminescence. Examples of the lanthanoid complex having a bidentate ligand containing a halogen atom and having an acetylacetone skeleton include Eu(TFA)$_3$phen, Eu(TFA)$_3$dpphen, Eu(HFA)$_3$phen, [Eu(FPD)$_3$]bpy, [Eu(TFA)$_3$]tmphen, and [Eu(FPD)$_3$]phen. The structures of such a lanthanoid complex having a bidentate ligand containing a halogen atom and having an acetylacetone skeleton are shown below.

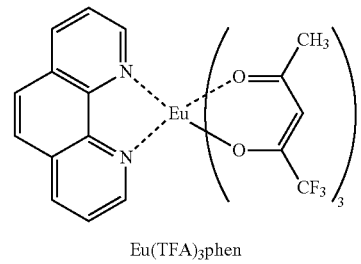

Eu(TFA)$_3$phen

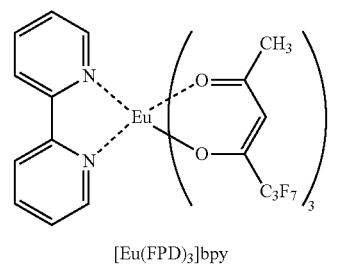

[Eu(FPD)$_3$]bpy

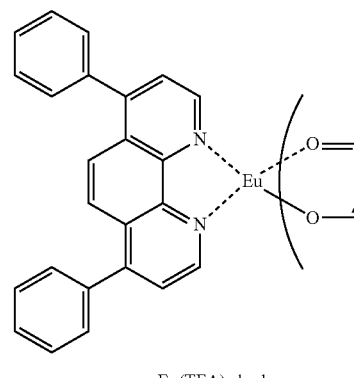

Eu(TFA)$_3$dpphen

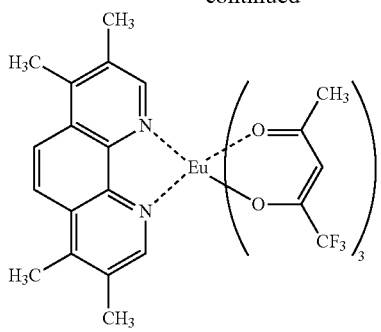

[Eu(TFA)₃]tmphen

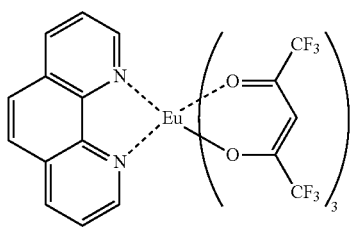

Eu(HFA)₃phen

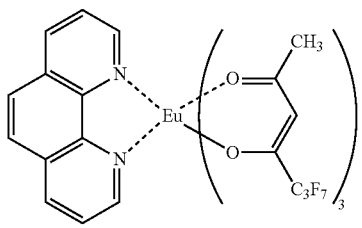

[Eu(FPD)₃]phen

Examples of the lanthanoid complex having a bidentate ligand containing a halogen atom and having an acetylacetone skeleton additionally include Tb(TFA)₃phen, Tb(TFA)₃dpphen, Tb(HFA)₃phen, [Tb(FPD)₃]bpy, [Tb(TFA)₃]tmphen, and [Tb(FPD)₃]phen.

The lanthanoid complex having a ligand containing a halogen atom is preferably particulate. The particulate form makes it easier to finely disperse the lanthanoid complex having a ligand containing a halogen atom in the light emitting layer.

When the lanthanoid complex having a ligand containing a halogen atom is particulate, the lower limit of the average particle size of the lanthanoid complex is preferably 0.01 μm, and the upper limit thereof is preferably 10 μm. The lower limit is more preferably 0.03 μm, and the upper limit thereof is more preferably 1 μm.

As the aforementioned fluorescent material, a fluorescent material having a terephthalic acid ester structure can be also used. The fluorescent material having a terephthalic acid ester structure emits light by irradiation with light rays.

Examples of the fluorescent material having a terephthalic acid ester structure include a compound having a structure represented by formula (9) below and a compound having a structure represented by formula (10) below. One of these may be used singly, or two or more of these may be used.

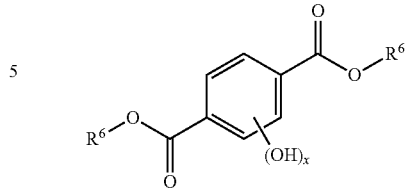

(9)

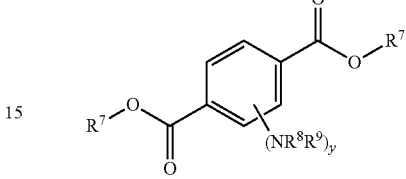

(10)

In formula (9) above, $R^6$ represents an organic group, and x is 1, 2, 3, or 4.

For further enhancing the visible light transmittance of the window glass, x is preferably 1 or 2, more preferably has a hydroxyl group at the 2- or 5-position of the benzene ring, and further preferably has hydroxyl groups at the 2- and 5-positions of the benzene ring.

The organic group of $R^6$ is preferably a hydrocarbon group, more preferably a hydrocarbon group having 1 to 10 carbon atoms, further preferably a hydrocarbon group having 1 to 5 carbon atoms, particularly preferably a hydrocarbon group having 1 to 3 carbon atoms. When the hydrocarbon group has 10 or less carbon atoms, the fluorescent material having a terephthalic acid ester structure can be easily dispersed in the light emitting layer. The hydrocarbon group is preferably an alkyl group.

Examples of the compound having a structure represented by formula (9) above include diethyl-2,5-dihydroxyterephthalate and dimethyl-2,5-dihydroxyterephthalate. Among these, the compound having a structure represented by formula (9) above is preferably diethyl-2,5-dihydroxyl terephthalate ("diethyl 2,5-dihydroxyterephthalate" available from Aldrich).

In formula (10) above, $R^7$ represents an organic group, $R^8$ and $R^9$ each represent a hydrogen atom or an organic group, and y is 1, 2, 3, or 4.

The organic group of $R^7$ is preferably a hydrocarbon group, more preferably a hydrocarbon group having 1 to 10 carbon atoms, further preferably a hydrocarbon group having 1 to 5 carbon atoms, particularly preferably a hydrocarbon group having 1 to 3 carbon atoms. When the number of carbon atoms in the hydrocarbon group is equal to or less than the upper limit, the fluorescent material having a terephthalic acid ester structure can be easily dispersed in the light emitting layer. The hydrocarbon group is preferably an alkyl group.

In formula (10) above, $NR^8R^9$ is an amino group. $R^8$ and $R^9$ are each preferably a hydrogen atom. Of the hydrogen atoms in the benzene ring of the compound having a structure represented by formula (10) above, one hydrogen atom may be replaced with the aforementioned amino group, two hydrogen atoms may be replaced with each the aforementioned amino group, three hydrogen atoms may be replaced with each the aforementioned amino group, and four hydrogen atoms may be replaced with each the aforementioned amino group.

The compound having a structure represented by formula (10) above is preferably diethyl-2,5-diaminoterephthalate (for example, available from Aldrich).

(Resin Film)

As described above, a resin film serving as the light emitting layer is preferably provided in the window glass. Further, the window glass preferably has a laminated glass structure in which an interlayer is provided between two transparent plates, and the two transparent plates are bonded together via the interlayer.

In the laminated glass structure, the interlayer is composed of a single layer of a resin film, and the resin film preferably serves as the light emitting layer. Further, two or more layers of resin films may be provided in the interlayer, and at least one of the plurality of resin films may serve as the light emitting layer.

Further, the resin film serving as the light emitting layer does not necessarily constitute the interlayer, and may be provided, for example, on the surface of any one of the transparent plates that is opposite to the surface on the interlayer side, in the laminated glass structure. Further, in the case when one transparent plate is provided in the window glass, the resin film may be provided on any one of the surfaces of the single layer transparent plate.

In the case when the resin film serving as the light emitting layer is provided on the opposite surface in the laminated glass structure or any one surface of the single layer transparent plate, a sheet-shaped member having the light emitting layer (resin film) may be bonded to the surface of the single layer glass or the laminated glass structure via an adhesive, a pressure-sensitive adhesive, or the like. Thus, the light emitting layer can be provided on the window glass by so-called post bonding by attaching such a sheet-shaped member onto existing window glass.

The resin film serving as the light emitting layer contains a resin and a fluorescent material, in which the fluorescent material is generally dispersed in the resin. The fluorescent material may be dispersed throughout the light emitting layer. Thereby, not only the end part of the window glass but also a wider region thereof can emit light with a high intensity. The resin used in the resin film is preferably a thermoplastic resin. Use of the thermoplastic resin makes it easy for the resin film to exert functions as an adhesive layer and facilitates bonding to the transparent plates or the like in the case of constituting an interlayer, as described above.

In the case when the resin film contains a fluorescent material, the content of the fluorescent material is preferably 0.001 parts by mass or more, more preferably 0.05 parts by mass or more, further preferably 0.1 parts by mass or more, based on 100 parts by mass of the resin. Adjusting the content of the fluorescent material to such a lower limit or more enables the window glass to sufficiently emit light. Further, the content of the fluorescent material is preferably 10 parts by mass or less, more preferably 3 parts by mass or less, further preferably 1.5 parts by mass or less. Adjusting the content to such an upper limit or less facilitates ensuring the transparency of the window glass.

The thickness of the resin film is not specifically limited, but is, for example, 0.1 to 2 mm, preferably 0.2 to 1 mm. Adjusting the thickness of the resin film to such a range enables sufficient light emission brightness to be ensured without impairing the transparency of the window glass.

Further, the thickness of the interlayer is not specifically limited, but is, for example, 0.1 to 3 mm, preferably 0.2 to 2 mm.

As described above, the resin used in the resin film is preferably a thermoplastic resin. Further, the thermoplastic resin used in the resin film is not specifically limited, but examples thereof include a polyvinyl acetal resin, an ethylene-vinyl acetate copolymer resin, an ionomer resin, a polyurethane resin, and a thermoplastic elastomer. Use of such a resin facilitates ensuring the adhesiveness of the resin film to the transparent plates and is thus particularly suitable in the case when the resin film constitutes an interlayer.

In the resin film, one of such thermoplastic resins may be used singly or two or more of them may be used in combination. Among these, a polyvinyl acetal resin is particularly suitable in that excellent adhesiveness to inorganic glass is exerted in the case when the resin film contains a plasticizer.

In the case when the resin film contains a thermoplastic resin, the resin film may further contain a plasticizer. The resin film is made flexible by containing a plasticizer, as a result of which, the window glass is made flexible. Further, the adhesiveness to the transparent plates can be enhanced, particularly in the case when the transparent plates are inorganic glass. In the case of using a polyvinyl acetal resin as the thermoplastic resin, the plasticizer is particularly effective when contained in the layer.

Examples of the plasticizer include organic ester plasticizers such as monobasic organic acid esters and polybasic organic acid esters, and phosphoric acid plasticizers such as organic phosphoric acid plasticizers and organic phosphorous acid plasticizers. Among these, organic ester plasticizers are preferable, and triethylene glycol-di-2-ethyl hexanoate (3GO) is particularly suitable.

The content of the plasticizer is not specifically limited, but the lower limit is preferably 30 parts by mass, and the upper limit is preferably 70 parts by mass, with respect to 100 parts by mass of the thermoplastic resin. When the content of the plasticizer is 30 parts by mass or more, the window glass is made appropriately flexible, so that the handleability is made good. Further, when the content of the plasticizer is 70 parts by mass or less, separation of the plasticizer from the resin film is prevented. The lower limit of the content of the plasticizer is more preferably 35 parts by mass, and the upper limit is more preferably 63 parts by mass.

Further, in the case when the resin film of the present invention contains a thermoplastic resin, the thermoplastic resin, or the thermoplastic resin and the plasticizer serve as main components, and the total amount of the thermoplastic resin and the plasticizer is generally 70 mass % or more, preferably 80 mass % or more, further preferably 90 mass % or more, based on the total amount of the resin film.

The resin film that does not serve as a light emitting layer is as described above, except that it does not contain a fluorescent material. Further, the resin film may contain additives such as antioxidants, adhesion modifiers, ultraviolet absorbers, infrared absorbers, and antistatic agents, as required.

(Transparent Plate)

As the transparent plate, those which can be used for window glass can be used without specific limitation, and inorganic glass and organic glass can be used. The inorganic glass is not specifically limited, but examples thereof include clear glass, float plate glass, polished plate glass, figured glass, net-wired plate glass, line-wired plate glass, and green glass.

Further, as the organic glass, those generally called resin glass are used without specific limitation, but examples thereof include transparent organic glass composed of resins such as polycarbonates, acrylic resins, acrylic copolymer resins, and polyesters.

In the case when the window glass has two or more transparent plates, the plurality of transparent plates may be composed of the same material as each other and may be composed of different materials. For example, in the case when two transparent plates are included, one may be inorganic glass and the other may be organic glass. However, in the case when a plurality of transparent plates are included, the plurality of transparent plates are preferably all inorganic glass or all organic glass.

Further, the thickness of each transparent plate is not specifically limited, but is, for example, about 0.1 to 15 mm, preferably 0.5 to 5 mm. In the case when the window glass has a plurality of transparent plates, the thickness of each transparent plate may be the same or different.

As described above, in the window glass, the transparent plate may serve as the light emitting layer that emits visible light. In the case when the transparent plate serves as the light emitting layer, the transparent plate itself contains the fluorescent material. In such a case, the fluorescent material may be dispersed in the inorganic material constituting inorganic glass or the organic material (resin) constituting organic glass of the transparent plate. Here, the fluorescent material may be dispersed throughout the transparent plate. In the case when the transparent plate itself contains the fluorescent material, the content of the fluorescent material is preferably 0.001 parts by mass or more, more preferably 0.05 parts by mass or more, further preferably 0.1 parts by mass or more, relative to 100 parts by mass of the inorganic material constituting inorganic glass or 100 parts by mass of the resin constituting organic glass. Adjusting the content of the fluorescent material to such a lower limit or more enables the window glass to sufficiently emit light. Further, the content of the fluorescent material is preferably 10 parts by mass or less, more preferably 3 parts by mass or less, further preferably 1.5 parts by mass or less. Adjusting the content of the inorganic material to such an upper limit or less prevents the transparency of the window glass from being impaired by the fluorescent material.

In the case when the transparent plate contains the fluorescent material to serve as the light emitting layer, the window glass may have the laminated glass structure as described above or the transparent plate may be composed of a single layer. In the case of having the laminated glass structure, at least one transparent plate may serve as the light emitting layer.

The window glass may transmit visible light or may be configured not to transmit visible light, but preferably transmits visible light. To transmit visible light means, for example, that the visible light transmittance is 30% or more, preferably 50% or more.

In the case when the window glass is used, for example, as front side glass for a car, the visible light transmittance is preferably 70% or more, more preferably 75% or more, further preferably 80% or more, for enhancing the transparency of the window glass and ensuring the car safety. Further, the upper limit of the visible light transmittance is not specifically limited and is preferably as high as possible, but is practically preferably 99% or less, more preferably 95% or less. The visible light transmittance means an average of visible light transmittance at 400 to 780 nm and can be measured, for example, using an ultraviolet-visible-infrared spectrophotometer (UH4150, manufactured by available from Hitachi High-Technologies Corporation) according to JIS R3212.

Further, the window glass emits visible light due to the excitation light incident from the light source, as described above. The visible light is generally light having a wavelength of 400 to 780 nm. Further, the window glass may emit blue, green, red, and other light or may emit white light by mixing light of two or more colors. In the case of mixing light of two or more colors, for example, two or more light emitting layers may be provided, so that each layer emits light of different color for mixing colors, or one light emitting layer may contain two or more fluorescent materials.

The window glass preferably emits red light to alert pedestrians, the driver outside the car, or the like. Specifically, the window glass may emit light preferably having the maximum emission wavelength at 590 to 780 nm, more preferably 600 to 750 nm, further preferably 620 to 700 nm. In order to emit red light, a lanthanoid complex having a ligand containing a halogen atom may be, for example, used as the fluorescent material, and europium may be used as the lanthanoid.

Further, the window glass may be provided with a reflective film that reflects visible light or excitation light. The reflective film is preferably provided on the outer side of the vehicle, compared to the light emitting layer (that is, outward of the vehicle). The reflective film may reflect visible light or may reflect excitation light. As the reflective film, a known film such as a metal film, a visible light reflecting film, or the like may be used. Since the reflective film reflects visible light or the like emitted by the light emitting layer, providing the reflective film can further enhance the emission intensity of the window glass.

REFERENCE SIGNS LIST

10: Car door (vehicle door)
11: Car body
12: Door body
13: Window glass
13A, 13B: Transparent plate
13C: Interlayer
13E: Outer peripheral end part
13F: Rear end part
13X: Outer peripheral surface
13Y: Surface
20: Light emission device
21: Light source
21A: Output end
22: Detector
23: Controller
24: Light guide
24A: End part
24X: Side surface
30: Light source unit
31: MEMS mirror

The invention claimed is:
1. A light emission device comprising:
a light source irradiating excitation light; and
a window glass emitting visible light through incident radiation of the excitation light and being attached to a vehicle side door,
the window glass emitting the light by irradiation with the excitation light depending on an opening/closing state of the vehicle side door,
wherein the window glass is a side glass,
wherein the window glass has an outer peripheral end part,
wherein the window glass emits the light only through the outer peripheral end part,
wherein at least a rear end part of the outer peripheral end part emits the light,
wherein the window glass comprises a transparent plate, and wherein
   the window glass has a multilayer structure comprising a laminate of at least one transparent plate and a resin film, and
   the resin film comprises a resin and a fluorescent material capable of emitting visible light through incident radiation of excitation light.

2. The light emission device according to claim 1, wherein the excitation light enters from the outer peripheral surface side of the window glass.

3. The light emission device according to claim 1, wherein the window glass emits light by irradiation with the excitation light when the vehicle side door is opened.

4. A vehicle side door comprising
   the light emission device according to claim 1.

5. A notification method for notifying a person outside a vehicle that a vehicle side door is present, comprising:
   providing a light source irradiating excitation light and a window glass that emits visible light through incident radiation of the excitation light,
   wherein the window glass is attached to a vehicle side door,
   wherein the window glass is a side glass,
   wherein the window glass emits light by irradiation with the excitation light depending on an opening/closing state of the vehicle side door,
   wherein the window glass has an outer peripheral end part,
   wherein the window glass emits the light only through the outer peripheral end part,
   wherein at least a rear end part of the outer peripheral end part emits the light,
   wherein the window glass comprises a transparent plate, and
   wherein
      the window glass has a multilayer structure comprising a laminate of at least one transparent plate and a resin film, and
      the resin film comprises a resin and a fluorescent material capable of emitting visible light through incident radiation of excitation light.

6. The notification method according to claim 5, wherein the excitation light enters from the outer peripheral surface side of the window glass.

7. The notification method according to claim 5, wherein the window glass is capable of emitting light by irradiation with the excitation light when the vehicle side door is opened.

* * * * *